(12) United States Patent
Min et al.

(10) Patent No.: US 10,964,964 B2
(45) Date of Patent: Mar. 30, 2021

(54) METHOD AND SYSTEM FOR CONTROLLING HYDROGEN SUPPLY FOR FUEL CELL

(71) Applicants: Hyundai Motor Company, Seoul (KR); Kia Motors Corporation, Seoul (KR)

(72) Inventors: Boung Ho Min, Gyeonggi-Do (KR); Kyung Won Suh, Seoul (KR); Kyu Il Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 316 days.

(21) Appl. No.: 15/839,227

(22) Filed: Dec. 12, 2017

(65) Prior Publication Data

US 2019/0074529 A1   Mar. 7, 2019

(30) Foreign Application Priority Data

Sep. 1, 2017   (KR) .................. 10-2017-0111561

(51) Int. Cl.
*H01M 8/04746*   (2016.01)
*H01M 8/04089*   (2016.01)
(Continued)

(52) U.S. Cl.
CPC ... *H01M 8/04753* (2013.01); *H01M 8/04089* (2013.01); *H01M 8/04388* (2013.01);
(Continued)

(58) Field of Classification Search
CPC ............... H01M 8/04753; H01M 8/24; H01M 8/04992; H01M 8/04388; H01M 8/04089;
(Continued)

(56) References Cited

U.S. PATENT DOCUMENTS

2006/0019137 A1*  1/2006  Fukuda ............ H01M 8/04029
                                                    429/437
2008/0220303 A1*  9/2008  Yoshida ........... H01M 8/04097
                                                    429/423
(Continued)

FOREIGN PATENT DOCUMENTS

JP          5321959 B2       10/2013
KR       10-1303392 B1        9/2013
KR       10-2014-0083823      7/2014

*Primary Examiner* — Matthew T Martin
(74) *Attorney, Agent, or Firm* — Mintz Levin Cohn Ferris Glovsky and Popeo, P.C.; Peter F. Corless

(57) ABSTRACT

A method and a system for controlling hydrogen supply for a fuel cell are provided. The method includes calculating a target hydrogen supply pressure, which is a target pressure value of hydrogen supplied to a fuel cell stack based on a required output. A fuel supply valve (FSV) duty is then adjusted based on the calculated target hydrogen supply pressure and modes are determined based on the FSV duty or actual hydrogen supply pressure measurements of a sensor. A hydrogen supply pressure measurement is calculated according to each of the determined modes and the FSV duty is corrected based on the calculated target hydrogen supply pressure and the hydrogen supply pressure measurement.

10 Claims, 2 Drawing Sheets

(51) Int. Cl.
*H01M 8/0438* (2016.01)
*H01M 8/04992* (2016.01)
*H01M 8/24* (2016.01)

(52) U.S. Cl.
CPC ......... *H01M 8/04992* (2013.01); *H01M 8/24* (2013.01); *H01M 2250/20* (2013.01)

(58) Field of Classification Search
CPC ........... H01M 8/04746; H01M 8/0438; H01M 2250/20
See application file for complete search history.

(56) References Cited

U.S. PATENT DOCUMENTS

2013/0288146 A1   10/2013   Tsukagoshi et al.
2016/0133970 A1*   5/2016   Yamamoto ........ H01M 8/04753
                                                          429/444

* cited by examiner

METHOD AND SYSTEM FOR CONTROLLING HYDROGEN SUPPLY FOR FUEL CELL

CROSS-REFERENCE TO RELATED APPLICATION

This application claims the priority benefit of Korean Patent Application No. 10-2017-0111561 filed on Sep. 1, 2017, the disclosure of which is incorporated herein by reference.

TECHNICAL HELD

The present disclosure relates to a method and a system for controlling hydrogen supply for a fuel cell and, more particularly, to a method and a system for controlling the duty of a fuel supply valve (FSV) which adjusts a pressure of hydrogen supplied to a fuel cell stack.

BACKGROUND

A fuel cell system applied to a hydrogen fuel cell vehicle includes a fuel cell stack configured to generate electrical energy through electrochemical reactions of reaction gas; a hydrogen supply device configured to supply fuel hydrogen to the fuel cell stack; an air supply device configured to supply, to the fuel cell stack, air including oxygen which is an oxidizer necessary for the electrochemical reactions; and a heat and water management system configured to discharge heat, which is a by-product of the electrochemical reactions of the fuel cell stack, outside the fuel cell stack to optimally adjust an operation temperature of the fuel cell stack, and perform a water management function.

With regard to the hydrogen supply device for supplying the fuel hydrogen to the fuel cell stack, among others, the device is configured to control the duty of a fuel supply valve (FSV), arranged on a hydrogen supply line, to supply hydrogen in response to an output based on a driver's input, and thus supply hydrogen to the fuel cell stack. In particular, hydrogen, stored at high pressure in a hydrogen tank, is primarily decompressed through a head pressure control valve (HPR) and medium-pressure hydrogen is supplied to the front end of the FSV. The FSV supplies the medium-pressure hydrogen to the stack in an on/off control (e.g., pulse width modulation (PWM) control) manner.

In controlling the above-described FSV, two sensors may be provided for actually measuring a hydrogen supply pressure of the hydrogen supply line. In general, an average of hydrogen supply pressures which have been measured by the two sensors is used to calculate a hydrogen supply pressure measurement. However, when one of the two sensors has an error such as offset, moisture inflow, measurement stopping, etc. or when the sensors, although not short circuited or disconnected, sense an incorrect value, an error may occur in hydrogen supply pressure measurements. Accordingly, a correction value for the hydrogen supply amount may thus be erroneous, resulting in erroneously correcting the FSV duty or excessively oscillating control values. Thus, the hydrogen supplied to the fuel cell stack may be hyper- or hypo-pressurized, incurring the condition that fuel supply is interrupted.

The above information disclosed in this section is merely for enhancement of understanding of the background of the present disclosure and should not be taken as acknowledgement that this information forms the prior art that is already known to a person skilled in the art SUMMARY The present disclosure provides a method for controlling hydrogen supply for a fuel cell, whereby the calculation of hydrogen supply pressure measurements is differentiated according to control modes for pressures of hydrogen supplied to a fuel cell stack to improve the reliability of hydrogen supply pressure measurements.

In accordance with an aspect of the present disclosure, a method for controlling hydrogen supply for a fuel cell according to the present disclosure may include calculating a target hydrogen supply pressure, which is a target pressure value of hydrogen supplied to a fuel cell stack based on a required output; operating a fuel supply valve (FSV) duty based on the calculated target hydrogen supply pressure; determining modes based on the FSV duty or an actual hydrogen supply pressure measurement of a sensor and calculating a hydrogen supply pressure measurement according to each of determined modes; and correcting the FSV duty based on the target hydrogen supply pressure and the hydrogen supply pressure measurement, which have been calculated.

The calculating of the target hydrogen supply pressure may include calculating a necessary hydrogen amount based on an output required for the fuel cell and a target hydrogen supply pressure based on the necessary hydrogen amount which has been calculated. In the operation of the FSV duty, the FSV duty may be calculated based on the target hydrogen supply pressure using a preset map and an FSV may be operated based on the calculated duty. In the calculating of the hydrogen supply pressure measurement, when the FSV duty is within a preset range, an average value of actual hydrogen supply pressure measurements of a plurality of sensors may be calculated as the hydrogen supply pressure measurement.

In the calculating of the hydrogen supply pressure measurement, when the FSV duty is equal to or greater than a preset value, the hydrogen supply pressure measurement may be calculated by averaging an average value of actual hydrogen supply pressure measurements of the plurality of sensors, and a hydrogen supply pressure according to the FSV duty. The hydrogen supply pressure according to the FSV duty may be derived using a preset map. In addition, in the calculating of the hydrogen supply pressure measurement, when an error of the actual hydrogen supply pressure measurements of the plurality of sensors is greater than a preset range, actual hydrogen supply pressure measurements of a part of the plurality of sensors may be selected and used for calculating a hydrogen supply pressure measurement.

An actual hydrogen supply pressure measurement which is the closest to the hydrogen supply pressure based on the FSV duty among the actual hydrogen supply pressure measurements of the plurality of sensors may be selected and used for calculating the actual hydrogen supply pressure measurements of a part of the plurality of sensors. In the calculating of the hydrogen supply pressure measurement, when the FSV duty is equal to or greater than a preset value and when an error between the actual hydrogen supply pressure measurements of the plurality of sensors is greater than a preset range, the hydrogen supply pressure measurement may be calculated by averaging an average value of the actual hydrogen supply pressure measurements of the plurality of sensors, a hydrogen supply pressure according to the FSV duty, and a target hydrogen supply pressure.

Further, in the calculating of the hydrogen supply pressure measurement, modes may be determined based on the hydrogen pressure variation rates (FpPrsRat), calculated based on a variation amount of the target hydrogen supply pressure and a variation amount of the actual hydrogen supply pressure measurement of the sensor. The hydrogen pressure variation rate (FpPrsRat) may be calculated by the following equation.

$$F_p P_{rs} R_{at} = \left| \frac{\Delta P_{sns}}{\Delta P_{target}} - 1 \right|$$

wherein, $\Delta P_{target}$ is a variation amount of a target hydrogen supply pressure and $\Delta P_{sns}$ is a variation amount of an actual hydrogen supply pressure measurement of a sensor.

When the hydrogen pressure variation rate is equal to or greater than a first variation rate, the hydrogen supply pressure measurement may be calculated by averaging an average value of actual hydrogen supply pressure measurements of the plurality of sensors and a hydrogen supply pressure according to the FSV duty. In addition, when the hydrogen pressure variation rate is equal to or greater than a second variation rate, the hydrogen supply pressure measurement may be calculated by averaging an average value of actual hydrogen supply pressure measurements of the plurality of sensors, a hydrogen supply pressure according to the FSV duty, and a target hydrogen supply pressure.

In accordance with an aspect of the present disclosure, the system for controlling hydrogen supply for a fuel cell according to the present disclosure may include: a fuel supply valve (FSV) disposed on a hydrogen supply line through which hydrogen is supplied to a fuel cell stack and configured to adjust a supply pressure of hydrogen supplied to the fuel cell stack; a plurality of sensors disposed on the hydrogen supply line and configured to measure a hydrogen supply pressure; and a controller configured to calculate a target hydrogen supply pressure, which is a target pressure value of hydrogen supplied to the fuel cell stack based on a required output, operate a fuel supply valve (FSV) duty based on the calculated target hydrogen supply pressure, determine modes based on the FSV duty or the actual hydrogen supply pressure measurements of the sensors, calculate a hydrogen supply pressure measurement according to each of the determined modes, and correct the FSV duty based on the target hydrogen supply pressure and the hydrogen supply pressure measurement, which have been calculated.

The system for controlling hydrogen supply for a fuel cell may further include a memory configured to pre-store a map of the FSV duty according to a hydrogen supply pressure of the hydrogen supply line; and the controller may be configured to operate the FSV duty based on a target hydrogen supply pressure which is calculated using the map pre-stored in the memory. The method and the system for controlling hydrogen supply for a fuel cell in the present disclosure has the effect that, when a substantial error occurs between a plurality of sensors, the actual hydrogen supply pressure measured by an erroneous sensor may be eliminated, thus allowing normal hydrogen supply.

Further, the method and the system for controlling hydrogen supply for a fuel cell in the present disclosure has the effect that, even when actually measured values of a sensor are oscillated in a section where a control is performed for a high hydrogen supply pressure, a final control value for the hydrogen supply pressures may be maintained more stably. Moreover, the method and the system for adjusting hydrogen supply for a fuel cell in the present disclosure has the effect of increasing the completeness of fail-safe with regard to hydrogen supply for a fuel cell to cope with a situation in which a sensor malfunctions, thereby improving the reliability of a fuel cell vehicle.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Figure 1:
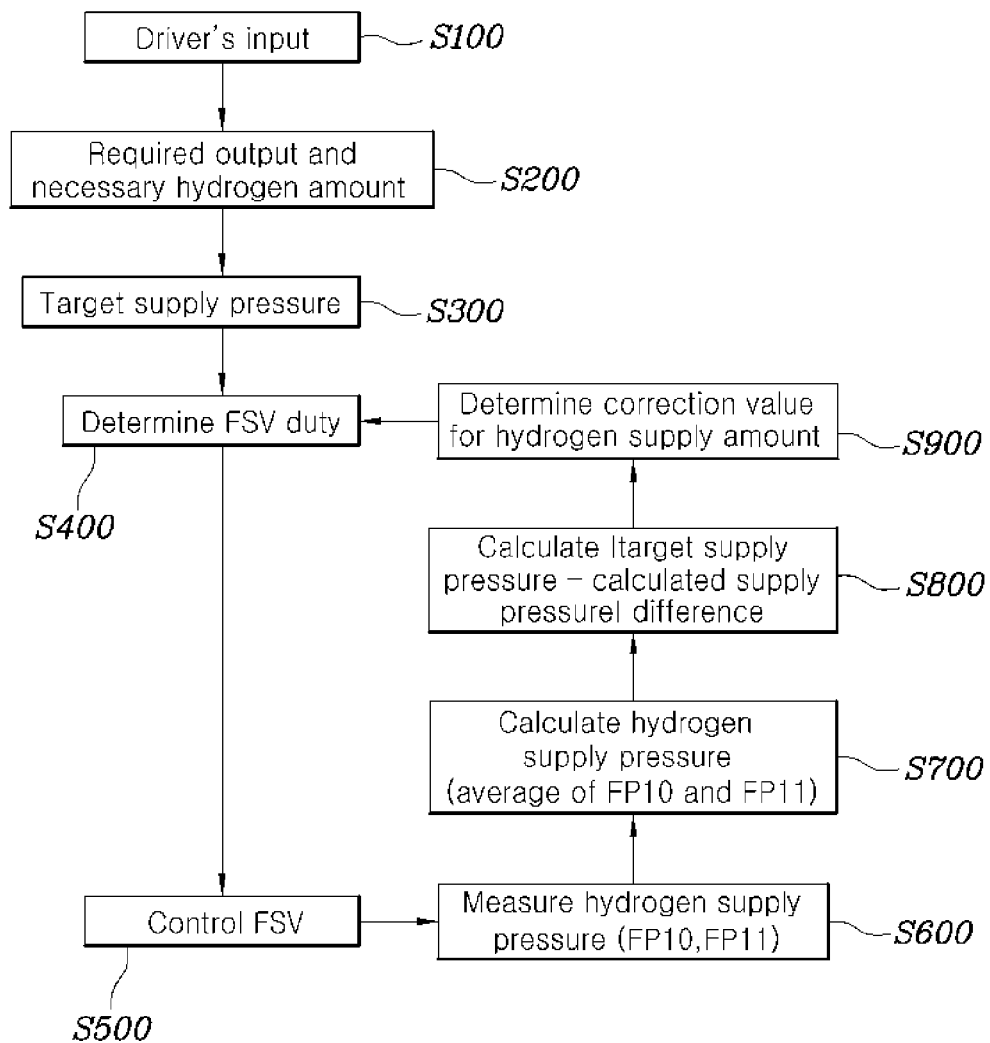
FIG. 1 is a flowchart of a method for controlling hydrogen supply for a fuel cell according to one exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

A specific structural or functional description of exemplary embodiments of the present disclosure disclosed in the specification or application is given merely for the purpose of describing the embodiment according to the present disclosure. Therefore, the exemplary embodiments according to the present disclosure may be implemented in various forms, and the present disclosure should not be construed as being limited to the exemplary embodiments described in the specification or application.

Various changes and modifications may be made to the exemplary embodiments according to the present disclosure, and therefore particular exemplary embodiments will be illustrated in the drawings and described in the specification or application. However, it should be understood that embodiments according to the concept of the present disclosure are not limited to the particular disclosed embodiments, but the present disclosure includes all modifications, equivalents, and alternatives falling within the spirit and scope of the present disclosure. Although the terms "ordinal numbers" such as first, second and the like may be used to describe various elements, the elements should not be defined by the terms. The terms are merely used to distinguish an element from another element, and thus a first element may be named a second element while the second element may be similarly named the first element, without departing from the scope of protection according to the concept of the present disclosure.

When an element is referral to as being "connected" or "accessed" to other elements, it should be understood that not only the element is directly connected or accessed to the other elements, but also another element may exist between them. Meanwhile, when a component is referral to as being "directly connected" or "directly accessed" to other component, it should be understood that there is no component therebetween. The other expressions of describing a relation between structural elements, i.e. "between" and "merely between" or "neighboring" and "directly neighboring", should be interpreted similarly to the above description.

Unless defined differently, all terms used herein, which include technical terminologies or scientific terminologies, have the same meaning as that generally understood by a person skilled in the art to which the present disclosure belongs. It should be interpreted that the terms, which are identical to those defined in general dictionaries, have the meaning identical to that in the context of the related technique. The terms should not be ideally or excessively interpreted as a formal meaning unless not clearly defined.

Hereinafter, an exemplary embodiment of the present disclosure will be described in detail with reference to the accompanying drawings similar reference numerals presented in the drawings denote similar elements. FIG. 1 is a flowchart of a method for controlling hydrogen supply for a fuel cell according to one exemplary embodiment of the present disclosure. The method described herein below may be executed by a controller.

Referring to FIG. 1, a method for controlling hydrogen supply for a fuel cell according to one exemplary embodiment of the present disclosure may include: calculating a target hydrogen supply pressure, which is a target pressure value of hydrogen supplied to a fuel cell stack based on a required output (S300); adjusting a fuel supply valve (FSV) duty based on the calculated target hydrogen supply pressure (S400, S500); determining modes based on the FSV duty or an actual hydrogen supply pressure measurement of a sensor and calculating a hydrogen supply pressure measurement according to each of determined modes (S700); and correcting the FSV duty based on the target hydrogen supply pressure and the hydrogen supply pressure measurement, which have been calculated (S900).

In particular, when a driver performs an input, for example, to turn a fuel cell on or to manipulate the operation of a fuel cell (S100), a controller may be configured to calculate an output required by the input and calculate a necessary hydrogen amount (S200). The controller may further be configured to calculate a target hydrogen supply pressure of a hydrogen supply line, which is a passage that supplies hydrogen from a hydrogen tank to a fuel cell stack, based on the necessary hydrogen amount that has been calculated (S300).

In other words, the calculating of the target hydrogen supply pressure (S300) may include calculating a necessary hydrogen amount based on an output required for a fuel cell and a target hydrogen supply pressure based on the necessary hydrogen amount (S400). A fuel supply valve duty (FSV duty) may be determined based on the target hydrogen supply pressure calculated (S400). The controller may be configured to adjust the opening of the FSV according to the determined FSV duty (S500).

Particularly, in the adjusting of the FSV duty (S400, 500), the controller may be configured to calculate the FSV duty according to the target hydrogen supply pressure based on a preset map (400) and may be configured to operate a fuel supply valve based on the calculated duty (S500). In other words, the FSV duty based to a target hydrogen supply pressure may be pre-stored as a map in a memory, and the controller may be configured to calculate the FSV duty based on the calculated target hydrogen supply pressure and the map pre-stored in the memory. After the fuel supply valve is opened based on the determined FSV duty, a sensor disposed on the hydrogen supply line may be configured to measure a hydrogen supply pressure of the hydrogen supply line (S600). A plurality of sensors may be provided and each may be configured to measure the hydrogen supply pressure of the hydrogen supply line.

In the present exemplary embodiment, an example is described where two sensors FP10 and FP11 are provided. A hydrogen supply pressure measurement may be calculated based on actual hydrogen supply pressure measurements of the two sensors (S700). Particularly, a plurality of modes may be determined based on the FSV duty or the actual hydrogen supply pressure measurements of the sensors, and the hydrogen supply pressure measurements may be calculated differently according to the determined modes.

The plurality of modes may be determined with reference to the FSV duty. While being stored at a high pressure in a hydrogen tank, hydrogen supplied to a fuel stack may be primarily decompressed to a medium pressure. The fuel supply valve may be configured to execute an on/off control (e.g., PWM control) for the medium-pressure hydrogen and supply the medium-pressure hydrogen to the fuel cell stack. Therefore, since the fuel supply valve is a core factor in a hydrogen supply control and adjusts directly and immediately the amount of hydrogen supplied to the stack, modes of the hydrogen supply control may be determined with reference to the FSV duty.

In particular, when the FSV duty is within a preset range, an average value of actual hydrogen supply pressure measurements of a plurality of sensors in a normal mode may be calculated as a hydrogen supply pressure measurement. For example, when the FSV duty ranges from about 25% to less than about 65% of the full duty, the mode may be determined to be a normal mode and thus an average value of actual hydrogen supply pressure measurements of two sensors FP10 and FP11 may be calculated as a hydrogen supply pressure measurement.

Further, when the FSV duty is equal to or greater than a preset value, a hydrogen supply pressure measurement may be calculated by averaging an average value of actual hydrogen supply pressure measurements of the plurality of sensors in a high current mode, and a hydrogen supply pressure according to the FSV duty. For example, when the FSV duty is equal to or greater than about 65% of the full duty, a hydrogen supply pressure measurement may be calculated by averaging an average value of actual hydrogen supply pressure measurements of the two sensors FP10 and FP11 when the supply amount and supply pressure of hydrogen are in a high state, and a hydrogen supply pressure according to a current FSV duty.

The hydrogen supply pressure according to the FSV duty may be derived based on a map preset in a memory of the controller. In other words, the memory may be configured to pre-store a map of hydrogen supply pressures according to FSV duty, and the controller may be configured to derive a hydrogen supply pressure according to the FSV duty using the map. The map may be the same as a map used in calculating a FSV duty according to a target hydrogen supply pressure, and the hydrogen supply pressure according the FSV duty may be the same as a target hydrogen supply pressure but may be different therefrom according to FSV duty correction as described later.

A high current mode refers to a mode in which a high hydrogen supply pressure is maintained, and uses more hydrogen supply pressures according to the FSV duty in calculating a hydrogen supply pressure measurement so that the final control value of the fuel supply valve may be prevented from overshooting and may be maintained more stably even when the actual hydrogen supply measurements of the sensors are oscillated. Further, a plurality of modes may be determined based on an actual hydrogen supply pressure measurement of a sensor. When an error of the actual hydrogen supply pressure measurements of the plurality of sensors is greater than a preset range, actual hydrogen supply pressure measurements of a part of the plurality of sensors in an error mode may be selected and used for calculating a hydrogen supply pressure measurement. For example, when an error difference (IFP10-FP11I) between the actual hydrogen supply pressure measurements of two sensors FP10 and FP11 is about 35% or greater of an actual hydrogen supply pressure measurement of one (FP10 or FP11) of the two sensors, the mode may be determined to be an error mode.

In other words, when an error between the respective actual hydrogen supply pressure measurements of the two sensors is substantial, the controller may be configured to determine that at least one of the two sensors is malfunctioning. Therefore, an actual hydrogen supply pressure may be more accurately measured by calculating the actual hydrogen supply pressure measurement of one selected from among the two sensors. In particular, an actual hydrogen supply pressure measurement which is the closest in value to the hydrogen supply pressure according to the FSV duty among the actual hydrogen supply pressure measurements of the plurality of sensors may be selected and used for calculating the actual hydrogen supply pressure measurements of a part of the plurality of sensors. The hydrogen supply pressure according to the FSV duty may be calculated based on a preset map.

Further, the modes may be determined based on the FSV duty and the actual hydrogen supply pressure measurements of sensors. In the calculating of the hydrogen supply pressure measurement, when the FSV duty is equal to or exceeds a preset value and when an error between the actual hydrogen supply pressure measurements of the plurality of sensors is beyond a preset range, the hydrogen supply pressure measurement may be calculated by averaging an average value of the actual hydrogen supply pressure measurements of the plurality of sensors in a high current error mode, a hydrogen supply pressure according to the FSV duty, and a target hydrogen supply pressure. For example, when the FSV duty is equal to or greater than about 65% of the full duty and an error difference (IFP10-FP11I) between actual hydrogen supply pressure measurements of the two sensors FP10 and FP11 is equal to or greater than about 10% of the actual hydrogen supply pressure measurement of one FP10 or FP11 of the two sensors, the mode may be determined to be a high current error mode.

In the high current error mode, a hydrogen supply pressure measurement may be calculated by averaging an average value of actual hydrogen supply pressure measurements of a plurality of sensors, a hydrogen supply pressure according to the FSV duty, and a target hydrogen supply pressure. The target hydrogen supply pressure may be calculated based on the necessary hydrogen amount and may be a value used to calculate the FSV duty through a preset map.

In the calculating of the hydrogen supply pressure measurement, modes may be determined according to the hydrogen pressure variation rates, which are calculated based on a variation amount of the target hydrogen supply pressure and a variation amount of the actual hydrogen supply pressure measurements of the sensors. In other words, hydrogen pressure variation rates may be calculated to determine modes and the hydrogen supply pressure measurements may be calculated differently according to the determined modes. The hydrogen pressure variation rate (FpPrsRat) may be calculated by the following equation.

$$F_p P_{rs} R_{at} = \left| \frac{\Delta P_{sns}}{\Delta P_{target}} - 1 \right|$$

wherein, $\Delta P_{target}$ is a variation amount of a target hydrogen supply pressure and $\Delta P_{sns}$ is a variation amount of an actual hydrogen supply pressure measurement of a sensor.

In relation to the variation amount $\Delta P_{target}$ of a target hydrogen supply pressure, the variation amount of a target hydrogen supply pressure which is calculated by the controller from the necessary hydrogen amount based on a required output or the variation amount which is calculated by the controller from the FSV duty through a map pre-stored in a memory may be used. The variation amount $\Delta P_{sns}$ of an actual hydrogen supply pressure measurement of a sensor may be calculated by using a part of actual hydrogen supply pressure measurements of a plurality of sensors or by using an average of the actual hydrogen supply pressure measurements of the plurality of sensors.

In the calculating of the hydrogen supply pressure measurement, when the hydrogen pressure variation rate is equal to or greater than a first variation rate, the hydrogen supply pressure measurement may be calculated by averaging an average value of actual hydrogen supply pressure measurements of the plurality of sensors in a high current mode and a hydrogen supply pressure according to the FSV duty. The first variation rate may be determined to be, for example, about 0.5.

Further, in the calculating of the hydrogen supply pressure measurement, when the hydrogen pressure variation rate is equal to or greater than a second variation rate, the hydrogen supply pressure measurement may be calculated by averaging an average value of actual hydrogen supply pressure measurements of the plurality of sensors in a high current error mode, a hydrogen supply pressure according to the FSV duty, and a target hydrogen supply pressure. The second variation rate may be determined to be, for example, about 0.8. The high current mode and the high current error mode may be as described above, and a description thereof is thus omitted.

The controller may be configured to calculate a difference between the calculated hydrogen supply pressure measurement and the target hydrogen supply pressure (S800), determine a hydrogen supply amount to be corrected based on the difference between the calculated hydrogen supply pressure measurement and the target hydrogen supply pressure, and correct the FSV duty according to the determined hydrogen supply amount to be corrected (S900). Specifically, the FSV duty may be adjusted based on the target hydrogen supply pressure, which is a type of error-based feedback control in which a difference between the target hydrogen supply pressure and the hydrogen supply pressure measurement is calculated and used to calculate a control error which is, in turn, applied to correcting the FSV duty.

More specifically, a difference between the necessary hydrogen amount according to a target hydrogen supply pressure and the amount of hydrogen actually supplied to a fuel cell stack according to a hydrogen supply pressure measurement may be calculated to determine a correction value for the amount of hydrogen supplied to the fuel cell stack. In other words, when the hydrogen supply pressure measurement is greater than the target hydrogen supply pressure, the FSV duty may be decreased. When the hydrogen supply pressure measurement is less than the target hydrogen supply pressure, the FSV duty may be further increased. In addition, a greater difference between the hydrogen supply pressure measurement and the target hydrogen supply pressure determines a correction value for the hydrogen supply amount, and results in more accurately correcting the FSV duty.

The FSV duty may be corrected, reflecting the correction value of the hydrogen supply amount, and thus the fuel supply valve may be operated according to the corrected duty. In other words, the FSV duty may be determined by reflecting a hydrogen supply pressure measurement based on a target hydrogen supply pressure calculated based on the necessary hydrogen amount, and the fuel supply valve may be operated based the determined FSV duty.

Figure 2:
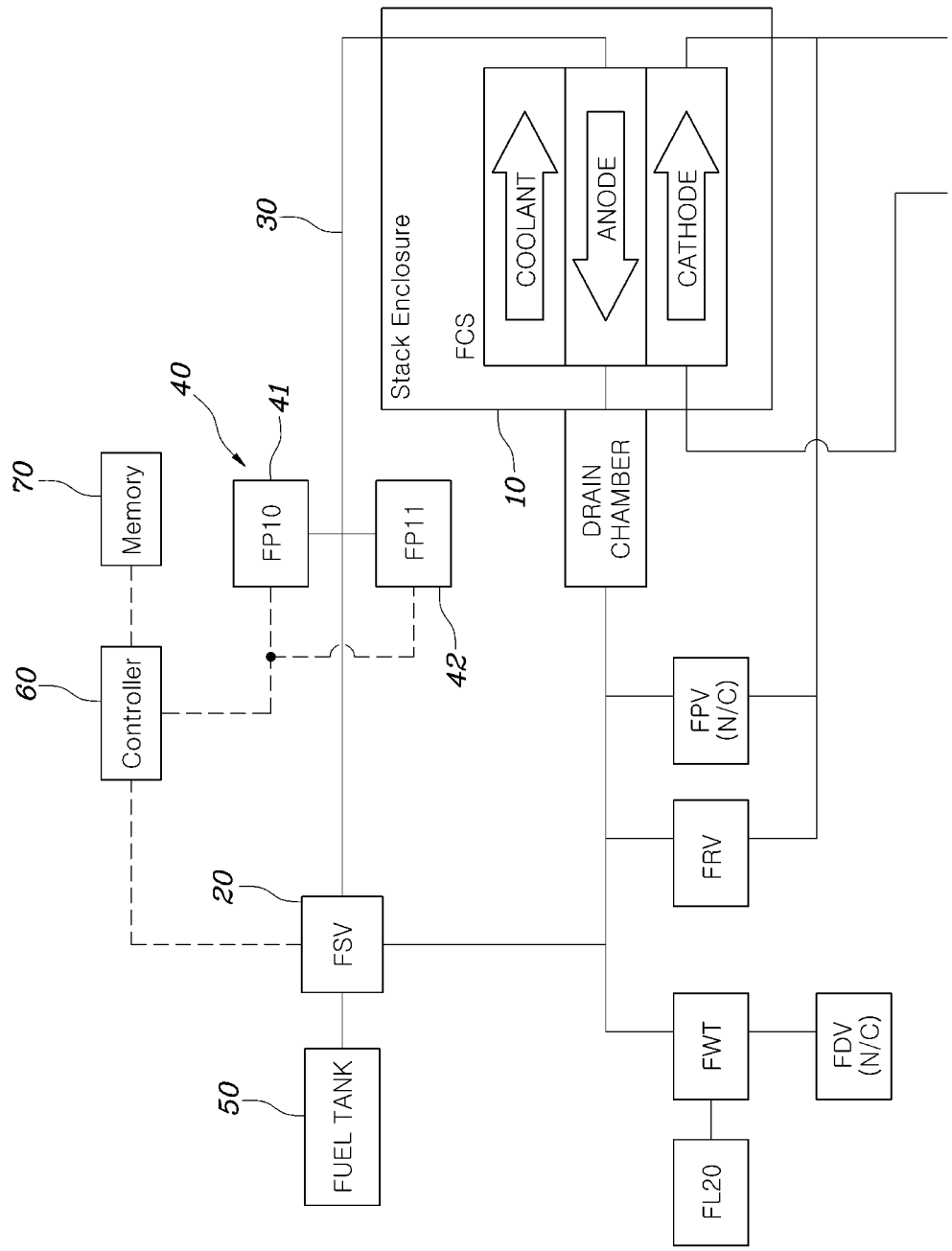
FIG. 2 is a configurational diagram of a system for controlling hydrogen supply for a fuel cell according to one exemplary embodiment of the present disclosure.

FIG. 2 is a configurational diagram of a system for controlling hydrogen supply for a fuel cell according to one exemplary embodiment of the present disclosure. Referring to FIG. 2, a system for controlling hydrogen supply for a fuel cell according to one exemplary embodiment of the present disclosure may include: a fuel supply valve (FSV) 20 disposed on a hydrogen supply line 30 through which hydrogen is supplied to a fuel cell stack 10 and configured to adjust a hydrogen supply pressure; a plurality of sensors 40 disposed on the hydrogen supply line 30 and configured to measure a hydrogen supply pressure; and a controller 60 configured to calculate a target hydrogen supply pressure, which is a target pressure value of hydrogen supplied to the fuel cell stack 10 based on a required output, adjust a duty of the FSV 20 based on the calculated target hydrogen supply pressure, determine a plurality of modes based on the duty of the FSV 20 or the actual hydrogen supply pressure measurements of the sensors 40, calculate a hydrogen supply pressure measurement according to each of the determined modes, and correct the duty of the FSV 20 based on the target hydrogen supply pressure and the hydrogen supply pressure measurement, which have been calculated.

In FIG. 2, a solid line refers to a pipe through which a gas, such as hydrogen or oxygen, may flow, and dotted lines refer an electric wire through which a control signal may be transmitted. The hydrogen supply line 30 may be a line along which hydrogen is supplied from a fuel tank 50 to an anode of the fuel cell stack 10. A blower, an ejector, etc. for recirculation may be disposed on the hydrogen supply line 30, but are omitted in the drawing. The fuel supply valve 20 may be disposed on the hydrogen supply line 30 to adjust the pressure of hydrogen supplied to the fuel cell stack 10 by adjusting the FSV duty.

Additionally, the plurality of sensors 40 may be pressure sensors disposed at the same location on the hydrogen supply line 30 to measure the pressure at the same location. However, the sensors may be configured to measure pressures at different locations having the same pipe thickness.

In the present exemplary embodiment, two sensors FP10 41 and FP11 42 have been described merely as an example and the number of sensors is not limited thereto. The two sensors may be configured to transmit an actual hydrogen supply pressure measurement of the hydrogen supply line 30 to the controller 60. The system for controlling hydrogen supply for a fuel cell may further include a memory 70 configured to pre-store a map between the duty of the FSV 20 and a hydrogen supply pressure of the hydrogen supply line 30; and the controller 60 may be configured to adjust the duty of the FSV 20 based on a target hydrogen supply pressure which is calculated using the map pre-stored in the memory 70. Hereinafter, a description of the system for controlling hydrogen supply for a fuel cell is similar to that of the method for controlling hydrogen supply for a fuel cell and will thus be omitted.

Although the present disclosure has been described and illustrated with reference to the exemplary embodiments thereof, it will be apparent to those skilled in the art that various improvements and modifications of the present disclosure can be made without departing from the technical idea of the present disclosure provided by the following claims.

What is claimed is:

1. A method for controlling hydrogen supply for a fuel cell, comprising:
   calculating, by a controller, a target hydrogen supply pressure, which is a target pressure value of hydrogen supplied to a fuel cell stack based on a required output;
   adjusting, by the controller, a fuel supply valve (FSV) duty based on the calculated target hydrogen supply pressure;
   determining, by the controller, a plurality of control modes for controlling the duty of the FSV that adjusts pressures of hydrogen supplied to the fuel cell stack based on the FSV duty or an actual hydrogen supply pressure measurement of a sensor and calculating a hydrogen supply pressure according to each of determined modes; and correcting, by the controller, the FSV duty based on the target hydrogen supply pressure and the hydrogen supply pressure, wherein when the FSV duty is within a preset range, an average value of actual hydrogen supply pressure measurements of a plurality of sensors, is calculated as the hydrogen supply pressure to cope with a situation in which a sensor malfunctions, wherein the preset range is from about 25% to less than about 65% of full duty of the FSV duty, and wherein when the FSV duty is equal to or greater than a preset value, the hydrogen supply pressure measurement is calculated by averaging an average value of actual hydrogen supply pressure measurements of the plurality of sensors, and a hydrogen supply pressure according to the FSV duty, wherein the preset value is equal to or greater than about 65% of fully duty of the FSV duty.

2. The method of claim 1, wherein the calculating of the target hydrogen supply pressure includes calculating a necessary hydrogen amount based on an output required for the fuel cell and a target hydrogen supply pressure based on the necessary hydrogen amount.

3. The method of claim 1, wherein the FSV duty is calculated according to the target hydrogen supply pressure based on a preset map used in calculating the FSV duty according to the target hydrogen supply pressure and a FSV is adjusted based on the calculated duty.

4. The method of claim 1, wherein the hydrogen supply pressure according to the FSV duty is calculated based on a preset map used in calculating the FSV duty according to the target hydrogen supply pressure.

5. The method of claim 1, wherein when a difference of the actual hydrogen supply pressure measurements of the plurality of sensors is greater than a preset range, actual hydrogen supply pressure measurements of the plurality of sensors are selected and used for calculating a hydrogen supply pressure.

6. The method of claim 5, wherein an actual hydrogen supply pressure measurement which is a closest measurement value to the hydrogen supply pressure according to the FSV duty among the actual hydrogen supply pressure measurements of the plurality of sensors is be selected and used for calculating the actual hydrogen supply pressure measurements of the plurality of sensors.

7. The method of claim 1, wherein when the FSV duty is equal to or greater than a preset value and when a difference between the actual hydrogen supply pressure measurements of the plurality of sensors is greater than a preset range, the hydrogen supply pressure is calculated by averaging an average value of the actual hydrogen supply pressure measurements of the plurality of sensors, a hydrogen supply pressure according to the FSV duty, and a target hydrogen supply pressure.

8. The method of claim 1, wherein the plurality of modes are determined according to a hydrogen pressure variation rate which is calculated based on a variation amount of the target hydrogen supply pressure and a variation amount of the actual hydrogen supply pressure measurement of the sensor, and wherein the hydrogen pressure variation rate (FpPrsRat) is calculated by the following equation, $$FpPrsRat = \left| \frac{\Delta P_{sns}}{\Delta P_{target}} - 1 \right|$$

wherein, $\Delta P_{target}$ is a variation amount of a target hydrogen supply pressure and $\Delta P_{sns}$ is a variation amount of an actual hydrogen supply pressure measurement of a sensor.

9. The method of claim 8, wherein when the hydrogen pressure variation rate is equal to or greater than a first variation rate, the hydrogen supply pressure measurement is calculated by averaging an average value of actual hydrogen supply pressure measurements of the plurality of sensors and a hydrogen supply pressure according to the FSV duty.

10. The method of claim 8, wherein when the hydrogen pressure variation rate is equal to or greater than a second variation rate, the hydrogen supply pressure measurement is calculated by averaging an average value of actual hydrogen supply pressure measurements of the plurality of sensors, a hydrogen supply pressure according to the FSV duty, and a target hydrogen supply pressure.

* * * * *